May 31, 1966   E. P. BRIGNAC ETAL   3,253,892
APPARATUS FOR PREPARING POLYCARBONAMIDES
Filed July 22, 1963   2 Sheets-Sheet 1
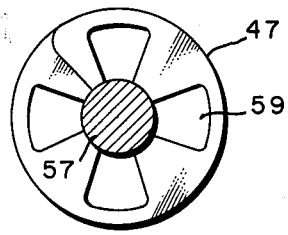
FIG. 3.
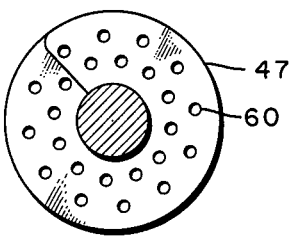
FIG. 4.
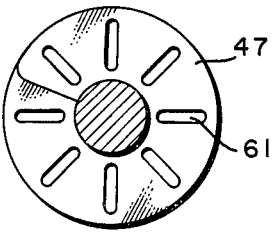
FIG. 5.
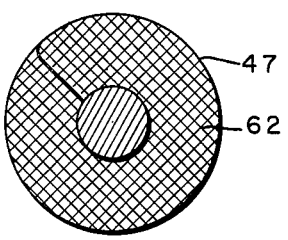
FIG. 6.
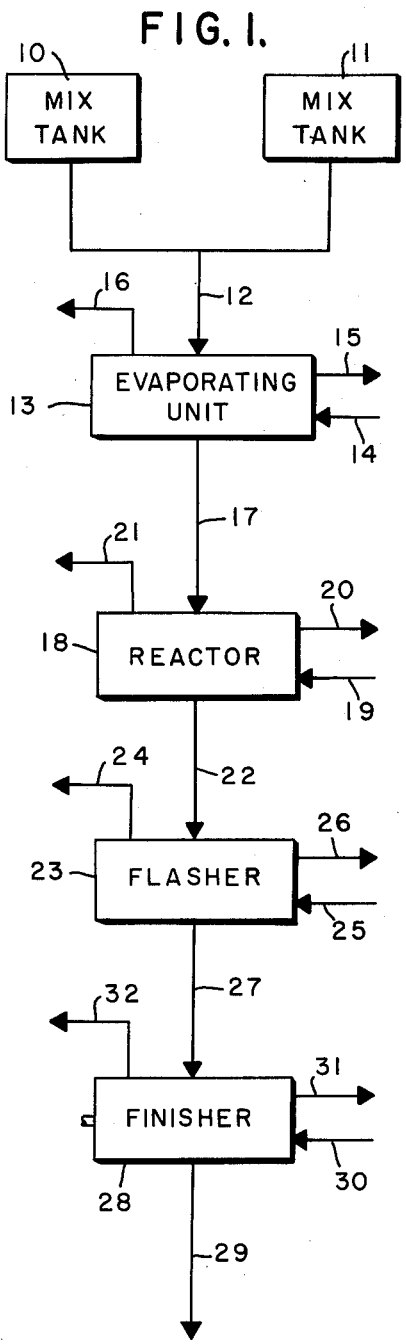
*INVENTORS*
EDMOND P. BRIGNAC
JAMES J. HUDGENS
ROBERT T. WRIGHT
ATTORNEY May 31, 1966 E. P. BRIGNAC ETAL 3,253,892
APPARATUS FOR PREPARING POLYCARBONAMIDES
Filed July 22, 1963 2 Sheets-Sheet 2
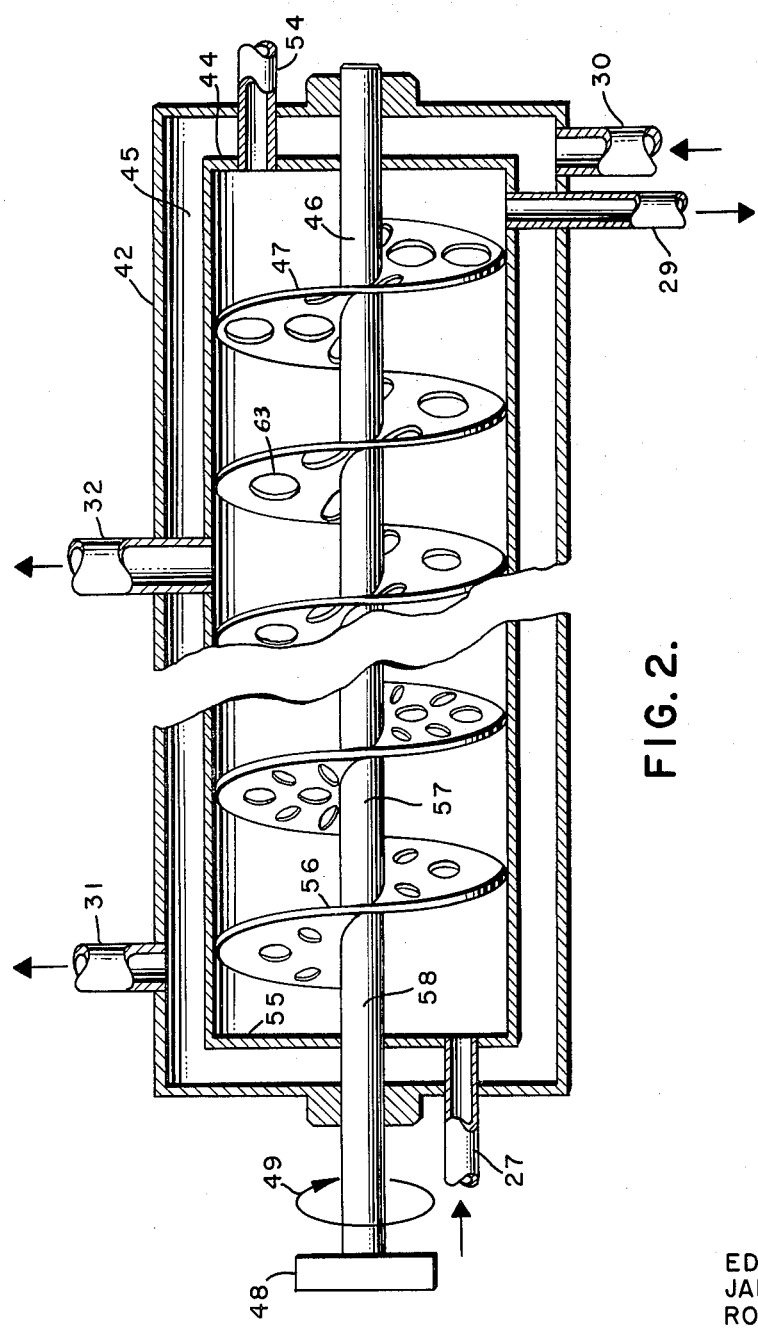
FIG. 2.
INVENTORS
EDMOND P. BRIGNAC
JAMES J. HUDGENS
ROBERT T. WRIGHT
BY 
ATTORNEY

United States Patent Office 3,253,892
Patented May 31, 1966

3,253,892
APPARATUS FOR PREPARING
POLYCARBONAMIDES
Edmond P. Brignac and James J. Hudgens, Pensacola, and Robert T. Wright, Pensacola Beach, Fla., assignors to Monsanto Company, a corporation of Delaware
Filed July 22, 1963, Ser. No. 296,799
5 Claims. (Cl. 23—285)

This invention relates to a process for and an apparatus used in the preparation of high molecular weight polymers, and especially to those polymers prepared by condensation-type reactions, such as polyamides, polyesters, and the like. More particularly, this invention relates to a process for and an apparatus used in the continuous preparation of linear polycarbonamides of a type characterized by a high molecular weight, including those particularly useful in the formation of shaped articles such as fibers, filaments, and the like.

The production of linear condensation polymers from polymer forming reactants has assumed increasing commercial importance throughout various industries. In the formation of such linear polymers, particularly those of the type having properties which include film and fiber forming properties, the polymeric end product may be a polycarbonamide which is formed from liquid compositions comprising polycarbonamide forming reactants.

In one example of the formation of polycarbonamides, such as nylons and the like, a solution of a polyamide forming composition, which usually contains water or other solvent, is subjected to superatmospheric pressure and polyamide forming temperatures to carry out the polycondensation or polyamide forming reaction. As the polycondensation of polyamide forming composition progresses, the viscosity of the polyamide reaction mass increases in a well-known manner, and it has been found that with the use of heretofore known polymerization apparatus, portions of the viscous reaction mass tend to remain in a relatively stagnant or physically inert condition, particularly in the latter stages of the polycondensation process wherein the mass is ordinarily subjected to a reduced energy climate. This polycondensation climate, together with the increasing viscosity of the mass, tends to inhibit the efficient performance of the polycondensation process in that the poly-joining of the polyamide forming composition is impeded greatly and in that considerable difficulty is experienced in removing the water of reaction or other unwanted polycondensation product from the reaction mass. As a result of the inclination of the water of reaction or other polycondensation product to remain engaged in the mass, there is a tendency for the polycondensation process to reverse or not to proceed to normal completion, thereby producing a polyamide end product of inferior quality and low molecular weight.

Further, difficulties have been encountered in the use of present day polycondensation apparatus, not only as a result of the enervating climate inherently induced by the use of the known apparatus and to which the reaction mass is subjected, but also as a result of inferior heat transfer conditions common to such apparatus. Because of these drawbacks, it has been found that the reaction mass must be maintained at a high temperature for long periods of time in order to insure evaporation of volatile products and a favorable completion of the polycondensation reaction. Maintaining polymer forming compositions such as those described above at a high temperature for a relatively long period produces thermal degradation or degeneration of the resultant polymer.

In addition, as the polymerization process nears completion and the viscosity of the reaction mass approaches its desired optimum value, the heat applied to the mass may create an excess of polymerization, undesirable side reactions, or both, which may result in clusters of obnoxious material commonly referred to as "gels." Although the chemical composition of those gels is not understood precisely, it is known that these gels are objectionable and cause a substantial reduction in the quality of the polymeric end product. Various structures have been proposed to maintain the reaction mass in a turbulent state and to promote good heat transfer conditions, particularly during the latter stages of a polymerization; but all of these have failed to overcome the gelation problem, and thermal degradation of the polymer is still encountered when attempts are made to produce polymer with high molecular weight.

It is, therefore, a primary object of this invention to provide a new and novel apparatus and process for the manufacture of synthetic polymers.

Another object of this invention is to provide a new and novel apparatus and process for making high quality synthetic linear polycondensation polymers such as polycarbonamides, and particularly those having film and fiber forming properties.

Still another object of this invention is to provide a new and novel apparatus and process for preparing synthetic linear polycondensation polymers which reduces or eliminates thermal degradation and gelatinous formations in the polymer forming reaction masses.

A further object of this invention is to provide a new and novel apparatus and polymerization process for producing synthetic linear polymers in which a polycondensation process can be carried out in an efficient manner to produce polymer of high molecular weight which can be spun into fibers and filaments.

A still further object of the invention is to provide a new and novel apparatus for mixing and conveying viscous liquids.

Other objects and advantages of the invention will become apparent from the following description thereof taken in connection with the accompanying drawing.

The objects of the invention are accomplished by providing a polymer forming reaction mass which, in a preferred specific embodiment, includes an aqueous solution of a diamine-dibasic carboxylic salt. In the initial phases of the novel process, the reaction mass is subjected to an elevated temperature and a suitable pressure to evaporate a part of the solvent from the reaction mass solution. The residue of evaporation is subjected to proper conditions of temperature and pressure to convert progressively a major portion of the reaction mass to a polycondensation product while the water of reaction, or like substance produced as the result of the union of the molecules of the reaction, mass is removed. This resultant polymerized reaction mass which is capable of undergoing further conversion to a higher molecular weight polymer is conducted continuously through a vessel wherein sufficient heat is applied to the system to remove the water of reaction or like substance from the system as a gas.

Because of the high viscosity of the reaction mass at this point in the system, it is necessary that a maximum holding time of the mass be obtained so that the bubbles of steam or like gaseous substance will be permitted to rise through the viscous reaction mass and be removed to prevent a reaction equilibrium from being set up. Also, because of markedly increasing viscosity of an already viscous mass within the reaction vessel at this stage of the process, it is important that the viscous mass entering this stage of the process does not run by the more viscous mass about to exit, thereby permitting insufficiently polymerized material mixed with gel and thermally degraded material to be obtained from the process.

The maximum holding time of the reaction mass within this stage of the system and the prevention of run-by of the more viscous material exiting by the lower viscosity material entering are obtained by means of an apparatus comprising a horizontal vessel containing a screw pumping device which rotates upon an axis essentially parallel to the major axis of the vessel and the direction of flow of the reaction mass through the vessel. The screw pumping device comprises a shaft with screw flights extending therefrom with the said flights having openings therein. The pitch of the flights may be uniform or may vary.

The novel features which are believed to be characteristic of the invention are set forth with particularity in the appended claims. The invention itself, however, both as to its organization and method of operation, may be understood best by reference to the following description taken in conjunction with the accompanying drawing in which:

FIGURE 1 is a flow chart or diagram illustrating a polymerization process in accordance with this invention; and, FIGURE 2 is a vertical view, partially cut away, of a device embodying one form of the invention and is a part of a finisher as shown in the flow diagram of FIGURE 1.

FIGURE 3 is a partial cross-sectional view of the apparatus of FIGURE 2 and shows a cross section of the screw pumping device.

FIGURES 4, 5, and 6 are cross-sectional views of screw pumping devices having different configurations within the scope of this invention.

Although, in general, any suitable polymer forming composition may be processed with the novel method of this invention, those materials capable of undergoing polycondensation to produce polymers of high molecular weight, e.g. those having fiber forming characteristics, are preferably processed. It is with reference thereto that the novel method of this invention will be described exemplarily. Polymer forming compositions suitable for preparing fiber forming polymers in accordance with this invention may be of a type from which polycarbonamides are prepared, and it is for the preparation of polycarbonamides, which include the commercially produced nylons, that the description of the invention will be directed specifically hereinafter.

With reference now to FIGURE 1, there is shown schematically by means of a flow chart or diagram one embodiment of the novel method for making linear polymers contemplated by the invention. The polymerization apparatus employed to carry out the process of FIGURE 1 comprises a pair of containers or mix tanks 10 and 11 in which proper proportions of the constituents comprising the polymer forming composition or reaction mass may be placed initially and mixed uniformly, if desired. As an example of polymer forming compositions, the reaction mass within the mix tanks 10 and 11 may comprise a mixture of organic primary or secondary diamine and organic dibasic carboxylic acid, salt thereof, or a polymerizable monoamino organic acid. It should be understood that the method of the invention may be practiced more advantageously by providing initially the polyamide forming composition in aqueous solution form. For instance, a 45 percent (%) to 50% or higher aqueous solution of hexamethylene ammonium adipate may be provided when it is desired to store the solution at or near room temperature under atmospheric pressure.

By a means not shown, the solution of polyamide forming salt or reaction mass is conveyed, as indicated by line 12 to evaporating unit 13, or like means for expelling water by heat, through which the mass is moved continuously. In this operation, the concentration of the polymer forming material in the aqueous solution is increased to the range of 60% to 75% by weight or more. Evaporating unit 13 may be of any of the known heat exchanger types such as a shell and tube evaporator in which heat is supplied to the reaction mass by means of a suitable heating medium such as Dowtherm vapors, steam, or the like. The heating medium may be moved continuously through the unit 13 by means of inlet 14 and outlet 15. Preferably, the reaction mass in the evaporating unit is agitated by a suitable means (not shown) to improve the heat transfer conditions and water expulsion. The evaporated water of solution or vapor may be removed from unit 13 through outlet 16.

For example, the solution of polyamide forming salt may be heated in the evaporating unit to a temperature of approximately 105° C. to 115° C. for approximately 20 to 30 minutes at suitable pressures to bring about this concentration. Depending upon the conditions of temperature and pressure in the evaporating unit, oligomerization of the reaction mass may begin therein also.

The reaction mass concentrated in evaporating unit 13 may be removed continuously therefrom by a means not shown and conducted through a feed line 17 to an autoclave or reactor 18. In an illustrated embodiment reactor 18 preferably is similar to evaporating unit 13 and may be, therefore, of the shell and tube type through which the reaction mass is moved continuously while heat is applied to the mass. In order to obtain polycondensation of the salt of adipic acid and hexamethylenediamine, the reaction mass may be pressurized within reactor 18 to a pressure of approximately 240 to 260 pounds per square inch and may be heated to an elevated polyamide forming temperature of approximately 235° C. As in evaporating unit 13, the mass in the reactor preferably may be heated by a heating medium which may be moved continuously through the system by inlet and outlet conduits 19 and 20, respectively, and the mass undergoing polycondensation may be agitated to improve the heat transfer conditions. The volatile products, including residual water of solution and the water of reaction produced in the reactor during polycondensation, may be removed through reactor outlet 21.

At the superatmospheric pressure and polyamide forming temperature existing within the reactor 18, a large percentage of the reaction mass moving continuously therethrough may be polycondensed and converted to a low molecular weight polyamide. Although the dwell time of the reaction mass in reactor 18 is selected in accordance with the particular process to be carried out, in one polymerization process practiced in accordance with this invention, a dwell time of approximately two hours is advantageous.

After sufficient dwell of the polymer reaction mass in reactor 18, the partially polymerized material may be removed continuously from the reactor and conveyed through line 22 to a pressure reduction unit or flasher 23. The partially polymerized reaction mass within flasher 23 may be quickly and continuously brought to substantially atmospheric pressure, and occluded water or like polymerization by-product in the liquid phase within the mass is evaporated or flashed from the mass permitting an increase in the degree of polymerization of the mass. The occluded water or like polymerization by-product may be removed from flasher 23 by line 24. At the same time, it is preferred that a predetermined amount of heat be supplied to the mass to replace the heat lost during the flashing operation. This heat may be supplied by a suitable heating medium flowing through the inlet and outlet conduits 25 and 26, respectively.

It should be understood that the above described steps of the polymerization process incorporated in the novel process of this invention are well known and have been practiced generally throughout the industry. The pressure and temperature values as well as the particular sequence of steps referred to above are for illustrative purposes only and departures therefrom may be made within the scope of the invention to obtain the partially polymerized reaction mass which is discharged from flasher 23. Furthermore, it should be understood that the mass leaving the flasher is not polycondensed completely, and further polycondensation resulting in a higher molecular weight polymer is necessary for a satisfactory end product.

The partially polymerized reaction mass at this stage is extremely viscous and difficult to handle. In accordance with the present invention, means have been provided for completing the polymerization of the reaction mass efficiently and with maximum utilization of equipment to obtain a polycarbonamide or other polycondensation polymer of extremely high quality, substantially free from gel and thermally degraded polymer, and in a high molecular weight suitable for subsequent fiber or film forming operations.

More specifically, the partially polymerized reaction mass may be conducted through line 27 to another unit or finisher 28. The reaction mass may be moved continuously therethrough in a manner such that maximum holding time of the reaction mass will be obtained therein by maximum utilization of the volume available within the finisher 28, and polymer of the desired high molecular weight in a proper distribution may exit at line 29. Heat may be supplied to the reaction mass within finisher 28 by a suitable heating medium which may enter the finisher system at 30 and exit at 31. The vapors from the reaction mass formed within finisher 28 may be removed through outlet 32.

In the continuous polymerization of nylon and other like condensation polymers, the final step of the process may be accomplished by a finishing unit which is basically a horizontal cylindrical vessel through which the reaction mass is moved by an unfilled screw conveyor of substantially the same diameter as the cylindrical vessel. The unfilled screw conveyor generally operates so as to segregate a particular part of the reaction mass between two adjacent flights of the screw conveyor and move this portion of the mass forward at a rate which corresponds to the product of the distance between adjacent flights of the screw, or pitch, times the rate of rotation of the screw conveyor. The reaction mass completes its polymerization to the desired molecular weight as it moves.

Referring now to FIGURE 2, there is shown in detail a finisher which embodies one form of the invention. Finisher 28 comprises a cylindrical vessel 42 suitably supported in a substantially horizontal position, an inner cylindrical vessel 44 forming an annular space 45 between vessels 42 and 44, and a screw pumping device 46 having screw flights 47 thereon. Screw pumping device 46 may be rotated on its major axis by a drive mechanism (not shown) which operates through coupling 48 to rotate screw pumping device 46 in the direction shown at 49.

Reaction mass may enter the finisher through line 27, be moved horizontally by successive flights 47 by the rotation shown at 49, and be discharged from the finisher through line 29. A suitable heating medium such as Dowtherm vapors or steam may enter the annular space 45 by line 30 and exit by line 31 to give good circulation of the medium. The gas resulting from further polycondensation of the reaction mass within the finisher may be removed by a line 32 generally located at the top of the finisher and vacuum may be used to aid in the removal of the gas. Inert gas may enter the finisher by line 54 and exit with the vapor if desired.

In operation, the finisher is preferably in an unfilled condition. The flow of reaction mass into the finisher through line 27 is controlled so that the level of the mass between the end of the finisher 55 and the first flight 56 never exceeds the top of the screw shaft 57 shown at 58. In this manner then, a segmented portion of the reaction mass is moved positively to the outlet 29. In a preferred example of polycarbonamide such as nylon 6,6, it has been found that the velocity of the screw flights relative to the polymer mass must exceed one foot per minute to prevent formation of gel material and other forms of thermally degraded polymer.

Screw flights 47 have openings 63 therein to permit a part of the segmented portion of the reaction mass to flow between successive flights of the screw pumping device. These openings 63 may be on all or part of the screw flights 47 and may be of other configurations as shown at 59, 60, 61, and 62 in FIGURES 3, 4, 5, and 6, respectively. Combinations of openings 59, 60, 61, and 62, as well as others, in the screw flights of a given screw pumping device may be used also depending upon the viscosity of the liquid reaction mass and the desired molecular weight thereof.

The holding time of the polymer within the finisher is critical in order to obtain the desired degree of polymerization of the reaction mass. Prior to this invention, standard unfilled constant pitch screw device moving a particular segregated section of the reaction mass through the finisher at a constant linear velocity was thought to be necessary for obtaining good polymer. This was most inefficient because the density of the reaction mass in the finisher increases from the inlet to the outlet ends thereof as the polymerization continues and vapor disengagement proceeds. As an example, in the polymerization of nylon 6,6, specific gravities in the range of 0.30 to 0.38 are common for the reaction mass at the inlet of a finisher and specific gravities of 0.47 to 0.65 may be found at the outlet of a finisher. Since the density of the segregated portion of the reaction mass increases markedly as it moves through the finisher, the liquid level of the segregated portion of the reaction mass decreases markedly as it moves through a standard unperforated screw finisher. In an example, wherein the specific gravity of a segregated portion of the reaction mass increases from 0.305 at the inlet to 0.478 at the outlet, the liquid level of the segregate portion decreases to such an extent that the ratio of the volume of segregated portion of the reaction mass at the inlet to the volume of the same segregated portion at the outlet may be approximately 1.8 to 1.0. It can be seen readily from this that the full capacity of the finisher is not being utilized. Further, if a desired holding time of the reaction mass in the finisher is to be maintained to obtain the desired degree of polycondensation of the reaction mass, the rate of rotation of the screw device must be maintained constant which in turn will limit the throughput of the reaction mass to approximately one-half of that which could be possible with a finisher of a given volume. By the addition of perforations or openings on all or part of the screw device to permit a minor portion of the reaction mass to flow forward to a succeeding flight section, the volume output of polymer from a finisher of given size is approximately doubled.

The opening in the screw flights may comprise from 5% to 80% of the nominal surface area of the screw flights depending upon the viscosity of the material being conveyed and the amount of flow between flights that is desired. Also, the size of the openings in the flights may be varied from the finisher inlet end to the outlet end of the screw as shown in FIG. 2.

In a preferred example of the polymerization of nylon 6,6, the openings in the screw flights may be varied from ½ inch to 1½ inches diameter holes comprising approximately 20% to 30% of the flight area at the inlet end of the finisher to 1½ inches to 3 inches diameter holes comprising approximately 30% to 50% of the flight area at the outlet end of the finisher to adjust for a change in the melt viscosity of the polymer of from 50 to 200 poises at the inlet end of 1,500 to 15,000 poises at the outlet end and thereby obtain proper flow of the polymer horizontally within the vessel to maintain the level of the polymer at a constant level and to obtain a polymer having a desired molecular weight distribution.

Unexpectedly, attending this desired increase in volume output of a given finisher is the obtaining of polymer with a molecular weight distribution which was not heretofore possible. Prior to this invention, when attempts were made to produce higher average molecular weight nylon polymers with processes and apparatus which are well known in the art to give fibers and filaments made therefrom increased tenacity and impact strength, as well as other improved physical properties, polymer that was thermally degraded, contained gel, and had bad color was obtained. Not only these problems were encountered, but the polymer would not spin well into filaments because of spinning breaks at polymer spinnerettes and other processing locations. By the process and apparatus of this invention, a high molecular weight polymer is obtained which can be spun and processed without attending problems, using apparatus of the art, into fibers and filaments having improved physical properties such as tenacity and impact strength. Although it is not known clearly why the higher molecular weight polymers possible by the process and apparatus of this invention may be spun and processed without difficulty into fibers, filaments, and like materials, it is thought that this result is obtained because of the distribution of the molecular weight of the polymer molecules within the polymer mass. It is postulated that polymer mass having a high molecular weight comprises a major portion of polymer having an exceptionally high average molecular weight and a minor portion having a molecular weight lower than is generally obtained. The low average molecular weight portion of the polymer mass may act as an internal plasticizer for the high molecular weight portion so that the total polymer with a higher molecular weight may be processed by spinning and drawing in a manner well known in the art into fibers, filaments, and like materials with markedly improved physical properties.

This may be understood better by reference to the examples below which are intended to be illustrative and not restrictive.

EXAMPLE I

A sample of nylon 6,6 polymer was prepared in accordance with the preferred process of this invention using a horizontal screw type finisher with the screw thereof having perforations in the screw flights at or near the central axis or shaft of the screw. The pitch of the flights on the screw was constant and the perforations in the flights comprised from approximately 15% of the surface area of the flights of the screw at the inlet end of the finisher to approximately 40% of the surface area of the flights of the screw at the outlet end of the finisher. The area of the perforations varied substantially uniformly from 15% to 40% over the flights of the finisher from the inlet end to the outlet end of the finisher.

A portion of the sample of nylon 6,6 polymer prepared in this manner was subjected to summative fractionation for a determination of the molecular weight distribution of the polymer sample. The summative fractionation was performed in the usual manner known in the art by dissolving the polymer in an m-cresol and cyclohexane solution, dividing the nylon polymer solvent solution into aliquot parts, and precipitating coacervates from aliquot parts thereof by the addition of additional quantities of cyclohexane to each of the aliquot parts. The cyclohexane m-cresol ratios for the summative fractionation varied from 3.7 to 5.0 and the intrinsic viscosity and molecular weights of the fractions were calculated in the usual manner. The results of the summative fractionation are shown below in Table 1.

Table 1

| Fraction | Intrinsic Viscosity of Fraction | Molecular Weight of Fraction | Percent of Total Sample |
| --- | --- | --- | --- |
| 1 | 1.92–1.66 | 61,500–50,600 | 23.6 |
| 2 | 1.66–1.45 | 50,600–41,900 | 4.2 |
| 3 | 1.45–1.37 | 41,900–38,700 | 24.8 |
| 4 | 1.37–1.06 | 38,700–21,700 | 11.9 |
| 5 | 1.06–0.42 | 21,700–7,400 | 8.5 |
| 6 | Below 0.42 | Below 7,400 | 27.0 |

A second sample of nylon 6,6 polymer of substantially identical average molecular weight was prepared in the same equipment and under the same operating conditions of temperature and pressure as that of the sample above except that the finisher contained a screw device of identical size, shape, and pitch but without any perforations in the flights. A portion of this sample of nylon polymer was subjected to a substantially identical summative fractionation for molecular weight distribution determination and the results are shown below in Table 2.

Table 2

| Fraction | Intrinsic Viscosity of Fraction | Molecular Weight of Fraction | Percent of Total Sample |
| --- | --- | --- | --- |
| 1 | 2.08–1.81 | 69,200–57,000 | 10.0 |
| 2 | 1.81–1.63 | 57,000–49,300 | 18.9 |
| 3 | 1.63–1.41 | 49,300–32,800 | 14.0 |
| 4 | 1.41–1.17 | 32,800–31,100 | 19.0 |
| 5 | 1.17–0.92 | 31,100–22,300 | 11.0 |
| 6 | 0.92–0.68 | 22,300–14,600 | 4.1 |
| 7 | 0.68–0.55 | 14,600–10,800 | 3.0 |
| 8 | 0.55–0.45 | 10,800–8,200 | 20.0 |

As can be seen from Tables 1 and 2 above, sample 1 while having an overall average molecular weight substantially the same as that of sample 2, has approximately 27% of the sample with a molecular weight below 7400 and sample 2 does not have any portion with a molecular weight below 8200 to serve as an internal plasticizer and thereby facilitate improved spinning and handling characteristics of the polymer in subsequent textile and fiber forming operations as well as giving fibers and filaments formed therefrom increased tenacity and impact strength.

By this invention whereby openings are located in flights of the screw conveyor, the liquid level of the reaction mass within the finisher can be maintained at an essentially constant level from the inlet to the outlet, and there is maximum utilization of the volume available within the finisher. Further, there is better mixing of the polymer so that no slow or noncirculating volumes of polymer remain for periods longer than desired within the finisher. Rotational speeds of the screw conveyor can be increased markedly while maintaining holding time of the reaction mass within the finisher at a desired level, volume output of polymerized material of the desired quality can be increased markedly, and better heat transfer conditions are maintained within the finisher which assists in the prevention of gel formation and thermal degradation of the polymer.

As many apparently widely different embodiments of this invention may be made without departing from the spirit and scope thereof, it is to be understood that we do not limit ourselves to the specific embodiments thereof except as defined in the appended claims.

What is claimed is:

1. An apparatus comprising a vessel with generally cylindrical interior having its long axis substantially horizontal, means for heating said vessel, inlet means and outlet means for viscous material at opposite ends of said vessel, outlet means at top of said vessel for removing volatile material, a rotatable shaft substantially concentric with said long axis, said shaft having continuous screw flights affixed thereto substantially from said inlet to said outlet, said screw flights having an outside diameter approaching the diameter of said generally cylindrical interior of said vessel and having openings through said screw flights comprising from 5% to 80% of the total surface area of said screw flights, said openings in the first flight adjacent said inlet comprising from 5% to 30% of the surface area of said first flight, said openings in the last flight adjacent said outlet comprising 30% to 80% of the surface area of said last flight and said screw flights between said first flight and said last flight having surface area reduced substantially uniformly by openings from said first flight to said last flight.

2. The apparatus of claim 1 wherein said openings are substantially circular.

3. The apparatus of claim 1 wherein said openings are substantially square.

4. The apparatus of claim 1 wherein said openings in said first flight are 0.5 inch to 1.5 inch diameter circular holes and comprise from 20% to 30% of the surface area of said first flight.

5. The apparatus of claim 1 wherein said openings in said last flight are 1.5 inch to 3.0 inch diameter holes and comprise from 30% to 50% of said last flight surface area.

References Cited by the Examiner

UNITED STATES PATENTS

| | | | |
|---|---|---|---|
| 1,468,581 | 9/1923 | Steenberg | 259—97 |
| 2,517,833 | 8/1950 | Bourland | 198—213 X |
| 2,617,273 | 11/1952 | Findlay | 198—213 X |
| 3,046,099 | 7/1962 | Willey | 23—285 |
| 3,113,843 | 12/1963 | Li | 23—285 |
| 3,118,739 | 1/1964 | Atkinson et al. | 23—285 |
| 3,130,180 | 4/1964 | Wiloth | 260—78 |

FOREIGN PATENTS 658,144   2/1963   Canada.

MORRIS O. WOLK, *Primary Examiner.*

J. SCOVRONEK, *Assistant Examiner.*